United States Patent
Knezevic et al.

(10) Patent No.: US 10,393,208 B2
(45) Date of Patent: Aug. 27, 2019

(54) DAMPING VALVE FOR A VIBRATION DAMPER

(71) Applicant: ZF Friedrichshafen AG, Friedrichshafen (DE)

(72) Inventors: Aleksandar Knezevic, Eitorf (DE); Jörg Rösseler, Ruppichteroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 60 days.

(21) Appl. No.: 15/523,515

(22) PCT Filed: Oct. 12, 2015

(86) PCT No.: PCT/EP2015/073497
§ 371 (c)(1),
(2) Date: May 1, 2017

(87) PCT Pub. No.: WO2016/074867
PCT Pub. Date: May 19, 2016

(65) Prior Publication Data
US 2017/0321778 A1    Nov. 9, 2017

(30) Foreign Application Priority Data
Nov. 12, 2014   (DE) .......................... 10 2014 223 085

(51) Int. Cl.
*F16F 9/348*    (2006.01)
*F16F 9/18*    (2006.01)
(Continued)

(52) U.S. Cl.
CPC .......... *F16F 9/3481* (2013.01); *F16F 9/3484* (2013.01); *F16K 47/04* (2013.01);
(Continued)

(58) Field of Classification Search
CPC ........ F16F 9/3481; F16F 9/3484; F16F 9/185; F16F 9/341; F16K 47/07; B60G 13/06
(Continued)

(56) References Cited

U.S. PATENT DOCUMENTS 5,813,500 A * 9/1998 Deferme ................ F16F 9/341
188/282.8
5,881,759 A * 3/1999 Andersson ............. E03C 1/122
137/246

(Continued)

FOREIGN PATENT DOCUMENTS

DE         2109398      9/1972
DE     102010040458    3/2012

(Continued)

*Primary Examiner* — Jessica Cahill
(74) *Attorney, Agent, or Firm* — Cozen O'Connor

(57) ABSTRACT

A damping valve for a vibration damper includes a damping valve body with separate passage channels. The outlet orifices of the passage channels for a flow direction are connected to one another via a groove, which is covered by at least one valve disk and is bounded radially by at least one annular web on the radially inner side with respect to the center axis (A) of the damping valve and at least one annular web on the radially outer side with respect to the center axis (A) of the damping valve. The radially outer web has at least one first portion in which the support is configured as area support for the valve disk, and the radially outer web has at least one second portion in which the support is configured as line support for the valve disk.

5 Claims, 3 Drawing Sheets

(51) Int. Cl.
*F16F 9/34* (2006.01)
*F16K 47/04* (2006.01)
*B60G 13/06* (2006.01)

(52) U.S. Cl.
CPC .............. *B60G 13/06* (2013.01); *F16F 9/185* (2013.01); *F16F 9/341* (2013.01)

(58) Field of Classification Search
USPC .............................. 137/516.27; 251/333, 359
See application file for complete search history.

(56) References Cited

U.S. PATENT DOCUMENTS

| | | | |
|---|---|---|---|
| 5,884,665 A * | 3/1999 | Thurston | ............. F04B 39/1073 137/855 |
| 6,899,207 B2 * | 5/2005 | Deferme | ................. F16F 9/348 188/282.5 |
| 8,943,460 B2 | 1/2015 | Huebl | |
| 9,121,524 B2 | 9/2015 | Masahiro | |
| 9,188,117 B2 * | 11/2015 | Ito | ....................... F04B 39/1073 |

FOREIGN PATENT DOCUMENTS

| | | |
|---|---|---|
| EP | 0505773 | 9/1992 |
| JP | H0579525 | 3/1993 |

* cited by examiner

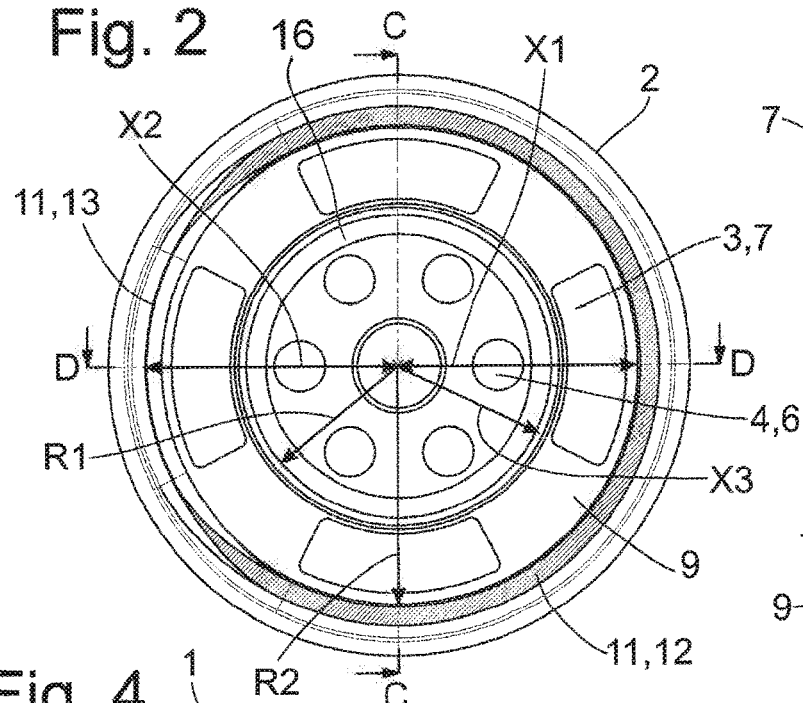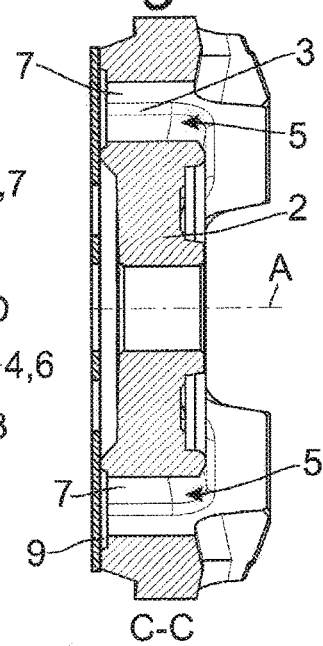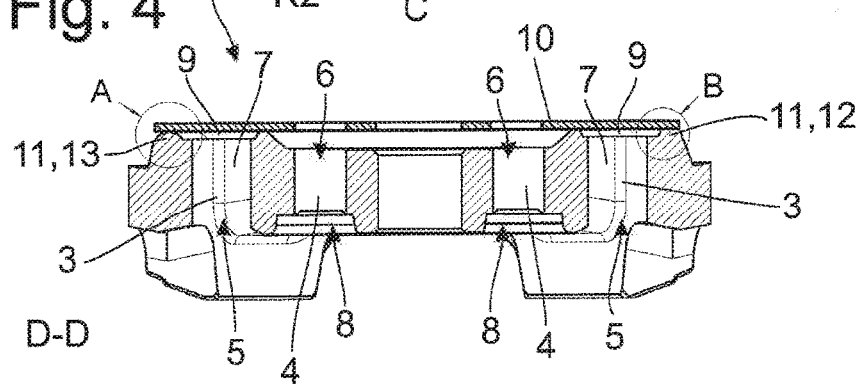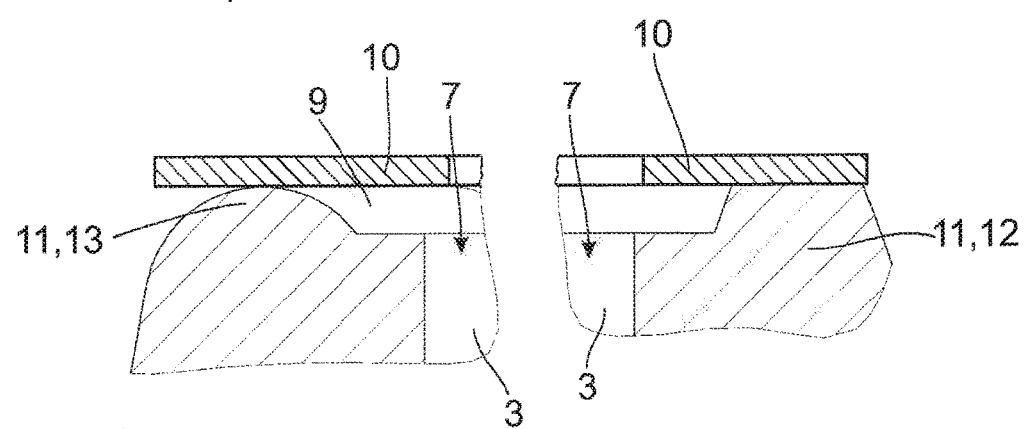

DAMPING VALVE FOR A VIBRATION DAMPER

PRIORITY CLAIM

This is a U.S. national stage of application No. PCT/EP2015/073497, filed on Oct. 12, 2015. Priority is claimed on the following application(s): Country: Germany, Application No. 10 2014 223 085.3, filed Nov. 12, 2014, the content of which is/are incorporated herein by reference in its entirety.

BACKGROUND OF THE INVENTION

The invention is directed to a damping valve for a vibration damper.

In a vibration damper in a motor vehicle, a damping medium is displaced through a damping valve as a result of a movement of a suspension. The damping valve generally comprises at least one passage channel for at least one flow direction of the damping medium, which passage channel connects at least one inlet orifice and at least one outlet orifice. The outlet orifice is covered by a valve disk which is lifted slightly by the damping medium when the damping medium flows through the passage channel. A sudden pressure equalization during the lifting movement of the valve disk results in knocking noises which may be perceived as annoying by the passengers of the motor vehicle.

A damping valve for a vibration damper is known from DE 10 2010 040 458 A1. This damping valve comprises a damping valve body with separate passage channels penetrating the damping valve body for different flow directions. The passage channels connect in each instance at least one inlet orifice and at least one outlet orifice for a damping medium. The outlet orifices of the passage channels for one flow direction are connected to one another via a circular groove which is covered by at least one valve disk and is bounded radially by at least one radially outer web which has a constant width, forms a continuous support surface for the valve disk and is constructed as a closed ring. The set of problems relating to noise is to be solved in DE 10 2010 040 558 A1 in that the passage channels for one flow direction in each instance are formed at a different radial distance from the center axis of the damping valve. What is achieved by the varying distances of the passage channels from the center axis of the damping valve is primarily that the valve disk is not lifted along its entire circumference simultaneously but rather is lifted sooner than the rest of the valve disk at a location defined by the greatest distance from the center axis. As a result of the valve disk opening sooner, the sudden pressure equalization takes place at an earlier point in time when the pressure difference to be compensated is smaller than in comparable generic damping valves.

However, owing to the support surface having a constant width in a damping valve of this kind, even small amounts of liquid will cause the valve disk to stick to the valve seat and the differential pressures which are correspondingly small at low absolute pressures are not sufficient to move the valve disk. Since the generic vibration dampers generally use a liquid damping medium or at least use a lubricant, a sticking effect of the type mentioned above cannot be ruled out. This prevents the valve disk from opening at the earliest possible time.

DE 21 09 398 C3 likewise describes a damping valve for a vibration damper. This damping valve comprises a damping valve body with a plurality of separate passage channels penetrating the damping valve body for different flow directions. The passage channels for one flow direction in each instance are formed at the same radial distance from a center axis of the damping valve and connect in each instance an inlet orifice and an outlet orifice for a damping medium. The outlet orifices of the passage channels for a flow direction are connected to one another via a groove which is covered by at least one valve disk and is bounded radially by at least one radially outer web which forms a continuous support for the valve disk and is constructed as a closed ring.

In the design according to DE 21 09 398 C3, the irregular width of the support surface results in a sticking effect which has a persistent negative effect on the opening behavior of the valve disk.

SUMMARY OF THE INVENTION

It is an object of the present invention to further develop a generic damping valve such that the known drawbacks are overcome.

This object is met in that the radially outer web has at least one first portion in which the support is configured as area support for the valve disk, and wherein the radially outer web has at least one second portion in which the support is configured as line support for the valve disk. In this way, the sticking effect in the second portion is substantially reduced, which allows a very prompt opening behavior of the valve disk and reduces noise.

In an advantageous embodiment, the radial distance between the center axis of the damping valve and the line support of the second portion of the radially outer web is greater than the radial distance between the center axis of the damping valve and the area support of the first portion of the radially outer web.

It can further be provided that the radial distance between the center axis A of the damping valve and the radially inner web is the same over the entire circumference of the radially inner web. In this way, an asymmetrical annular channel and, accordingly, an asymmetrical pressure-impinged surface at the valve disk is realized. The valve disk accordingly has a larger lever arm in the region of the second portion of the radially outer web and a smaller lever arm in the region of the first portion of the radially outer web. This allows a specifically one-sided, two-step opening of the valve disk which demonstrably reduces knocking noises.

According to a further embodiment, the second portion 13 of the radially outer web 11 is formed so as to be convex and rounded in cross section proceeding from the damping valve body. Accordingly, the support of the valve disk can be defined and the reduction of the sticking effect can be determined by the radius of the rounding. Further, a round support, i.e., a support having a radius in cross section, has proven to be especially robust over the life of the damping valve and is simple to produce.

It can be provided in an advantageous manner that the second portion of the radially outer web with the line support is arranged in the region of at least one outlet orifice. The response time of the valve disk can be influenced in this way and the opening of the valve disk can be further accelerated.

BRIEF DESCRIPTION OF THE DRAWINGS

Exemplary embodiments of the invention are explained in more detail in the drawings in which:

FIG. 2 is a top view of a damping valve body according to FIG. 1;

FIG. 3 is a sectional view C-C according to FIG. 2;

FIG. 4 is a sectional view D-D according to FIG. 2;

FIG. 5A shows an enlarged view of the second portion according to FIG. 4;

FIG. 5B shows an enlarged view of the first portion according to FIG. 4; and

DETAILED DESCRIPTION OF THE PRESENTLY PREFERRED EMBODIMENTS

Figure 6:
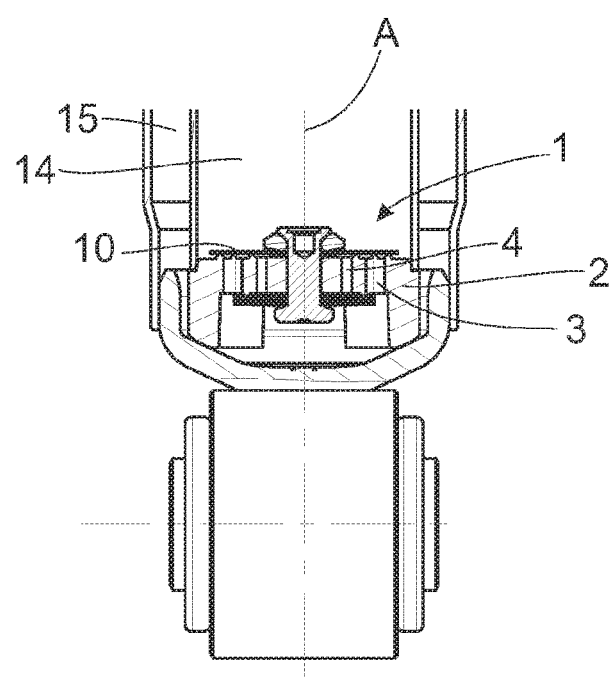
FIG. 6 shows a detail of a vibration damper.

FIG. 6 shows, by way of example, a detail of a vibration damper 1 constructed as a two-tube damper which has a damping valve 1 between a working chamber 14 which is filled with damping medium and a compensation space 15. In principle, the damping valve 1 can also be used for a piston rod or as pre-valve for an adjustable damping valve. The possible applications are limited neither to the graphic representation nor to the above-mentioned cases.

Figure 1:
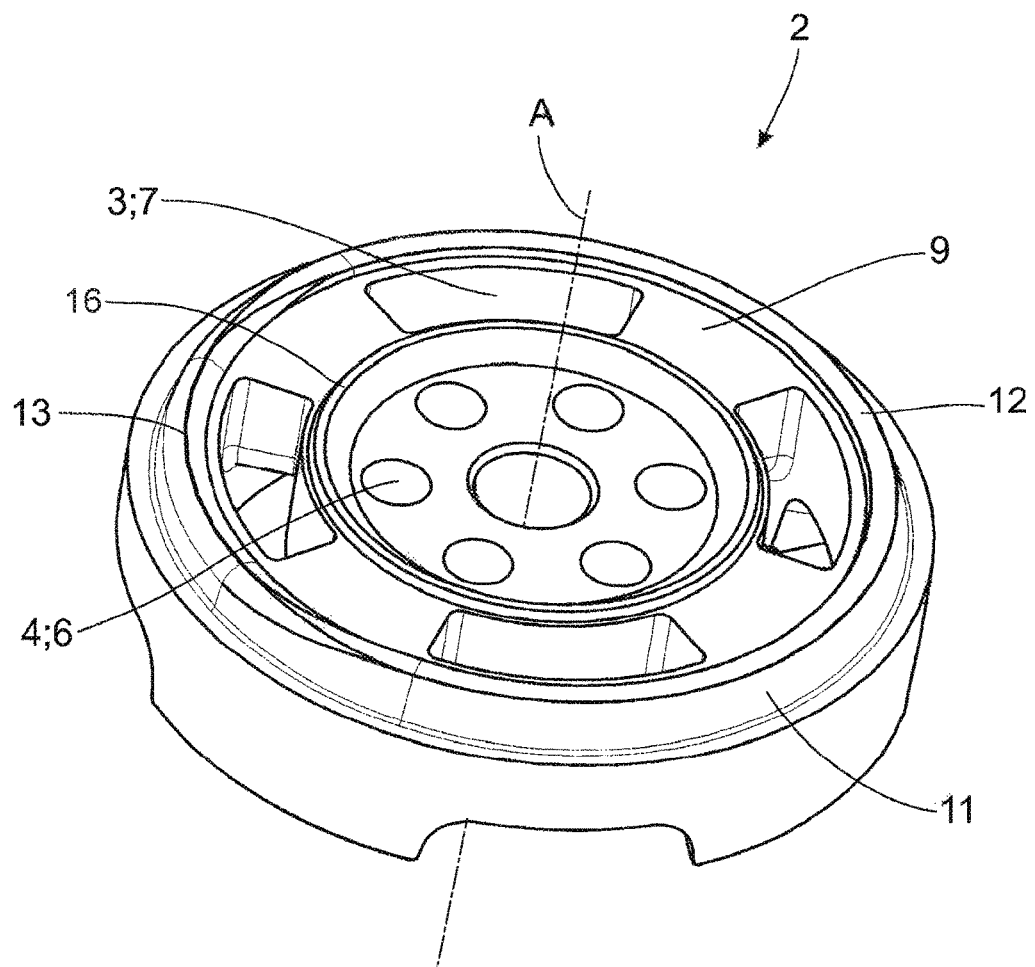
FIG. 1 is a perspective view of a damping valve body of a damping valve.

An embodiment of a damping valve body 2 of a damping valve according to the invention is shown in perspective in FIG. 1. This comprises a plurality of separate passage channels 3; 4 penetrating the damping valve body 2 for different flow directions. The passage channels for a flow direction are formed in each instance at the same radial distance from a center axis A of the damping valve 1. The passage channels 3 connect in each instance an inlet orifice 5 (FIG. 4), and an outlet orifice 7 for a damping medium. The outlet orifices 7 of the passage channels 3 are connected to one another via a groove 9.

Groove 9 is radially bounded by an annular web 16 on the radially inner side with respect to the center axis A of the damping valve and an annular web 11 on the radially outer side with respect to the center axis A of the damping valve 1. The two webs 11; 16 respectively form a continuous support in each instance for a valve disk 10, shown in FIGS. 3-5, and are constructed in each instance as a closed ring.

As shown the web 11 has two portions. In a first portion 12, the support of the web 11 comprises a broad planar area support for the valve disk which extends over at least a portion of the web. In the embodiment illustrated here, the first portion 12 extends over approximately ¾ of the web. The second portion 13 of the web is formed so as to be rounded and has a radius and accordingly affords a line support rather than an area support for the valve disk (FIGS. 5A and 5B).

Of course, the second portion of the web can also have a different shape, e.g., can be constructed so as to be acute-angled in cross section or the like, but a support having a radius has proven to be especially robust over the life of the damping valve and easy to produce. Further, the support of the valve disk can be defined and the reduction of the sticking effect can be determined by the magnitude of the radius R.

The support for a valve disk 10 formed by web 11 can be seen particularly clearly in the top view according to FIG. 2. Also shown particularly clearly in FIG. 2 are the first portion 12 with the area support, the second portion 13 with the line support for the valve disk 10, and a possible advantageous position of the line support on the radially inner web 16. It can be seen clearly that the radial distance X2 between the center axis A of the damping valve 1 and the line support of the second portion 13 of the radially outer web 11 is greater than the radial distance X1 between the center axis A of damping valve 1 and the area support of the first portion 12 of the radially outer web 11. The radial distance X3 between the center axis A of damping valve 1 and the radially inner web 16 is identical along the entire circumference of the radially inner web 16. It is further shown that the radially inner web 16 is formed annularly and has a constant radius of curvature R1 along its entire circumference. The radially outer web 11 is likewise annularly formed and also has a constant radius of curvature R2 along its entire circumference which is greater than the radius R1 of the radially inner web 16.

In the embodiment shown in FIG. 4, the second portion of the web with the line support is arranged in the region of an outlet orifice, which allows a particularly gentle opening of the valve disk at this location.

In a sectional view of a valve according to FIG. 2, FIG. 3 shows that the valve disk sits on the web 11 and closes the groove. The support for the valve disk 10 is formed as area support. In contrast, the sectional view according to FIG. 4 shows the first portion 12 and the second portion 13. The support for valve disk 10 is formed as area support in the first portion 12 of web 11 and as line support in the second portion 13 of the web. It can be seen clearly that the second portion 13 is constructed so as to be convex and rounded in section considered from the damping valve body. The second portion 13 and the first portion 12 are shown in enlarged views again separately in FIGS. 5A and 5B.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A damping valve (1) for a vibration damper comprising:
a damping valve body (2) having a center axis (A), a groove (9) and a plurality of first and second passage channels (3; 4) having inlet orifices (5; 6) and outlet orifices (7; 8) and extending through the damping valve body (2) for different flow directions, each plurality of first and second passage channels (3; 4) for one flow direction being formed at the same radial distance from the center axis (A) of the damping valve (1), wherein each of the plurality of first and second passage channels (3; 4) are connected to the inlet orifices (5; 6) and the outlet orifices (7; 8) for damping medium;
wherein the outlet orifices (7) of the plurality of first passage channels (3) are connected to one another via the groove (9);
wherein the groove (9) is covered by at least one valve disk (10) and is bounded radially by a radially inner annular web (16) disposed on the radially inner side of the groove with respect to the center axis (A) of the damping valve (1), a radially outer annular web (11) disposed on the radially outer side of the groove with respect to the center axis (A) of the damping valve (1);

the radially inner web (16) and radially outer web (11) each forming a continuous support for the valve disk (10) and each being constructed as a closed ring;

wherein the closed ring forming the radially outer web (11) comprises at least one first ring segment (12) in which the support is configured as a support for the valve disk (10) continuously along a first dimension of the valve disk, and wherein the radially outer web (11) comprises at least one second ring segment (13) in which the support is configured as a support for the valve disk (10) continuously along a second dimension of the valve disk smaller than the first dimension, each of the first and second dimensions being defined radially along the vale disk;

and wherein the first and second ring segments of the radially outer web contacting the valve disk at circumferentially different locations of support of the valve disk such that, at each location of support about the circumference of the disk, only one of the first and second ring segments contacts the valve disk.

2. The damping valve (1) for a vibration damper according to claim 1, wherein the radial distance (X2) between the center axis (A) of the damping valve and the support of the second ring segment (13) of the radially outer web (11) is greater than the radial distance (X1) between the center axis (A) of the damping valve and the support of the first ring segment (12) of the radially outer web (11).

3. The damping valve (1) for a vibration damper according to claim 1, wherein the radial distance (X3) between the center axis (A) of the damping valve and the radially inner web (16) is the same over the entire circumference of the radially inner web (16).

4. The damping valve (1) for a vibration damper according to claim 1, wherein the second ring segment (13) of the radially outer web (11) is formed so as to be convex and rounded in cross section.

5. The damping valve (1) for a vibration damper according to claim ring segment (13) of the radially outer web (11) is arranged in a region of at least one of the outlet orifices (7).

* * * * *